United States Patent
Baik et al.

(10) Patent No.: US 11,255,104 B2
(45) Date of Patent: Feb. 22, 2022

(54) TENT SUPPORT

(71) Applicant: CAMPVALLEY (XIAMEN) CO., LTD., Fujian (CN)

(72) Inventors: Kwang ho Baik, Seoul (KR); Renhua Chen, Xiamen (CN)

(73) Assignee: CAMPVALLEY (XIAMEN) CO., LTD., Fujian (CN)

( * ) Notice: Subject to any disclaimer, the term of this patent is extended or adjusted under 35 U.S.C. 154(b) by 0 days.

(21) Appl. No.: 17/253,620

(22) PCT Filed: Apr. 3, 2019

(86) PCT No.: PCT/CN2019/081177
§ 371 (c)(1),
(2) Date: Dec. 18, 2020

(87) PCT Pub. No.: WO2019/242372
PCT Pub. Date: Dec. 26, 2019

(65) Prior Publication Data
US 2021/0172194 A1 Jun. 10, 2021

(30) Foreign Application Priority Data

Jun. 20, 2018 (CN) .......................... 201810635403.1
Nov. 19, 2018 (CN) .......................... 201811376347.0

(51) Int. Cl.
*E04H 15/50* (2006.01)
*E04H 15/46* (2006.01)
*F16B 7/10* (2006.01)

(52) U.S. Cl.
CPC ............. *E04H 15/50* (2013.01); *E04H 15/46* (2013.01); *F16B 7/105* (2013.01)

(58) Field of Classification Search
CPC .......... E04H 15/50; E04H 15/60; F16B 7/105
See application file for complete search history.

(56) References Cited

U.S. PATENT DOCUMENTS 4,947,884 A * 8/1990 Lynch ..................... E04H 15/50
135/145
5,794,640 A * 8/1998 Jang ........................ E04H 15/50
135/131

(Continued)

FOREIGN PATENT DOCUMENTS

CN 105971390 A * 9/2016
FR 1538616 A * 9/1968 .............. F16B 7/105

(Continued)

*Primary Examiner* — David R Dunn
*Assistant Examiner* — Danielle Jackson
(74) *Attorney, Agent, or Firm* — Leong C. Lei

(57) ABSTRACT

A tent support includes a plurality upright rods, a top module provided at a center of a top of the tent support, a plurality of side rod assemblies each connected to every adjacent two of the upright rods, and a plurality of top rod assemblies connected to the side rod assemblies and the top module. At least one positioning hole is provided at a junction of two adjacent side walls of each upright rod. A sliding seat provided on each upright rod includes a positioning member which is selectively engaged in the positioning hole, a spring, a positioning pin and an outward protruding button therein. The tent support, as a whole, is simple in structure, easy to assemble, and stable in positioning.

10 Claims, 9 Drawing Sheets

(56) References Cited

U.S. PATENT DOCUMENTS

| | | | | |
|---|---|---|---|---|
| 5,813,425 A * | 9/1998 | Carter | ...................... | E04H 15/50 135/145 |
| 6,575,656 B2 * | 6/2003 | Suh | ......................... | E04H 15/46 135/114 |
| 6,951,327 B1 * | 10/2005 | Seo | ......................... | E04H 15/46 248/188 |
| 7,299,813 B2 * | 11/2007 | Ochi | ....................... | E04H 15/50 135/131 |
| 7,395,830 B2 * | 7/2008 | Seo | ......................... | E04H 15/46 135/120.3 |
| 7,409,963 B2 * | 8/2008 | Mallookis | ............... | E04H 15/50 135/131 |
| 7,422,026 B2 * | 9/2008 | Kim | ........................ | E04H 15/50 135/120.2 |
| 7,849,867 B2 * | 12/2010 | Takayama | ............... | E04H 15/60 135/114 |
| 7,874,303 B2 * | 1/2011 | Xie | ......................... | E04H 15/50 135/120.3 |
| 8,220,477 B2 * | 7/2012 | Park | ....................... | E04H 15/50 135/145 |
| 9,248,072 B2 * | 2/2016 | Wu | .......................... | A61H 3/04 |
| 9,403,267 B2 * | 8/2016 | Ho | .......................... | F16B 7/105 |
| 9,828,788 B2 * | 11/2017 | Zhou | ....................... | E04H 15/48 |
| 10,526,811 B2 * | 1/2020 | Carter | .................... | E04H 15/405 |
| 10,806,247 B1 * | 10/2020 | Chen | .................... | A47B 13/088 |
| 10,806,248 B1 * | 10/2020 | Chen | .................... | A47B 3/0812 |
| 2004/0261221 A1 * | 12/2004 | Dumont | .................. | F16B 7/105 16/110.1 |
| 2006/0051159 A1 * | 3/2006 | Tsai | ........................ | F16B 7/105 403/109.3 |
| 2007/0012346 A1 * | 1/2007 | Choi | ........................ | F16B 7/105 135/114 |
| 2014/0030012 A1 * | 1/2014 | Lee | ......................... | E04H 15/50 403/326 |

FOREIGN PATENT DOCUMENTS

| | | | | |
|---|---|---|---|---|
| GB | 257406 A * | 9/1926 | ............. | F16B 7/105 |
| KR | 20080002408 U * | 7/2008 | | |
| WO | WO-2007064112 A1 * | 6/2007 | ............. | E04H 15/46 |

\* cited by examiner

TENT SUPPORT

BACKGROUND OF THE INVENTION

1. Field of the Invention

The present invention relates to tent accessories, and more particularly to a tent support.

2. Description of the Prior Art

In the prior art, a foldable tent support structure comprises a plurality upright rods, a top module provided at the center of the top of the tent support, a plurality of side rod assemblies each connected to every adjacent two of the upright rods, and a plurality of top rod assemblies connected to the side rod assemblies and the top module. A fixing seat is mounted at the top of each upright rod. A sliding seat is mounted on each upright rod to slide along each upright rod. The side rod assemblies are connected to the fixing seats of the upright rods. As the sliding seats slide on the upright rods, the tent can be unfolded and folded. The positioning of the sliding seat usually uses a spring in cooperation with a positioning structure to position the sliding seat. The head end of the spring is connected to the positioning structure and placed in the upright rod. A protrusion is provided on the positioning structure. The positioning structure is confined in the upright rod. Under normal circumstances, the protrusion will extend out of the upright rod. When the sliding seat slides to the position of the protrusion, it will push the protrusion, so that the protrusion is retracted into the upright rod and the spring is compressed. When the sliding seat slides to the position corresponding to the positioning hole facing the protrusion, the spring will make the protrusion extend outward to enter the positioning hole, thereby positioning the sliding seat. When the protrusion is pressed to disengage from the positioning hole of the sliding seat, the positioning of the sliding seat is released.

Therefore, although the positioning operation of the sliding seat is simple, but in order to facilitate assembly, there will be a certain gap between the sliding seat and the upright rod. This affects the positioning stability of the sliding seat, and the head end of the spring needs to be connected to the positioning structure and placed in the upright rod, which is complicated for assembly.

Accordingly, the inventor of the present invention has devoted himself based on his many years of practical experiences to solve these problems.

SUMMARY OF THE INVENTION

The primary object of the present invention is to provide a tent support that is simple in structure, easy to assemble, and stable in positioning.

In order to achieve the above object, the present invention adopts the following solutions.

A tent support comprises a plurality upright rods, a top module provided at a center of a top of the tent support, a plurality of side rod assemblies each connected to every adjacent two of the upright rods, and a plurality of top rod assemblies connected to the side rod assemblies and the top module. A fixing seat is mounted at a top of each upright rod. A sliding seat is mounted on each upright rod to slide along each upright rod so as to move the side rod assemblies and the top rod assemblies. The side rod assemblies are connected to the fixing seats of the upright rods. At least one positioning hole is provided at a junction of two adjacent side walls of each upright rod. The sliding seat includes a positioning member which is selectively engaged in the positioning hole, a spring, a positioning pin and an outward protruding button therein. The positioning pin runs inward through the sliding seat and through the positioning member. An engaging groove is provided on an end surface of the button facing the positioning member. One end of the positioning member is engaged in the engaging groove. One end of the spring is abutted against the button. Another end of the spring is abutted against an inner wall of the sliding seat.

The positioning member is an elongated bar.

The upright rods are rectangular rods, and the positioning member is ⋀-shaped.

A further positioning pin is provided between the button and the positioning member. The end of the positioning member has a slot for limiting movement of the further positioning pin.

The top module includes an upper runner and a lower runner. Each side rod assembly includes two link rod units hinged at respective ends to each other. Each top rod assembly includes a link rod unit. Each link rod unit of each side rod assembly includes two link rods that are hinged to each other and expanded into an "X" shape. First ends of the two link rods of the two link rod units of each side rod assembly are hinged to each other to form an upper hinge point and a lower hinge point. Second ends of the two link rods of the two link rod units of each side rod assembly are hinged to the fixing seats and the sliding seats of the adjacent two of the upright rods, respectively. The link rod unit of each top rod assembly includes a long rod and a short rod that are hinged to each other and expanded into an "X" shape. One end of the long rod of each top rod assembly is hinged to the lower hinge point of a corresponding one of the side rod assemblies. Another end of the long rod is hinged to the upper runner of the top module. One end of the short rod of each top rod assembly is hinged to the upper hinge point of the corresponding side rod assembly. Another end of the short rod is hinged to the lower runner of the top module.

The top module further includes a central rod. The upper runner and the lower runner are arranged on the central rod.

The upper runner is slidably arranged on the central rod. The lower runner is fixed at a bottom end of the central rod.

Alternatively, a top of the top module is a circular plate. A runner is provided under the circular plate. Each side rod assembly includes two link rod units hinged at respective ends to each other. Each top rod assembly includes a link rod unit. Each link rod unit of each side rod assembly includes two link rods that are hinged to each other and expanded into an "X" shape. Opposing ends of the two link rods of the two link rod units of each side rod assembly are hinged to the fixing seats and the sliding seats of the adjacent two of the upright rods, respectively. The link rod unit of each top rod assembly includes a long rod and a short rod that are hinged to each other and expanded into a linear shape, and a support rod having two ends hinged to the sliding seat and the long rod, respectively. One end of the long rod is hinged to one end of the short rod. Another end of the long rod is hinged to the sliding seat. Another end of the short rod is hinged to the runner of the top module.

A bottom of each upright rod is provided with a retaining part.

Each upright rod is formed by connecting and fixing a plurality of small rods through a fixing member.

After adopting the above technical solutions, the tent support of the present invention is designed through the structure of the sliding seat and the upright rod. When the tent support of the present invention needs to be folded, the user can press the button. The button links the positioning member that is engaged in the engaging groove of the button to slightly tilt up with the positioning pin as the fulcrum. The positioning member is disengaged from the positioning hole. At this time, because one end of the spring abuts against the button and the other end of the spring abuts against the inner wall of the sliding seat, the spring is compressed. Thus, the sliding seat can smoothly slide down along the upright rod to move the corresponding side rod assembly and the corresponding top rod assembly to be folded. When the tent support of the present invention needs to be unfolded and positioned, the user can press the button. The button links the positioning member that is engaged in the engaging groove of the button to tilt up with the positioning pin as the fulcrum. At this time, because one end of the spring abuts against the button and the other end of the spring abuts against the inner wall of the sliding seat, the spring is compressed. Thus, the sliding seat can slide up quickly along the upright rod until the sliding seat moves to the position of the positioning hole, and the button is released. When the positioning member moves up to the position corresponding to the positioning hole, the elastic force of the spring enables the button to protrude, and the positioning member is linked to be engaged in the positioning hole, so that the tent support of the present invention is unfolded and positioned. The present invention realizes positioning through the cooperation of the positioning member of the sliding seat and the positioning hole of the upright rod. Compared with the positioning of the sliding seat of the conventional tent support, the overall structure of the present invention is simple, easy to assemble and stable in positioning.

DETAILED DESCRIPTION OF THE PREFERRED EMBODIMENTS

Figure 1:
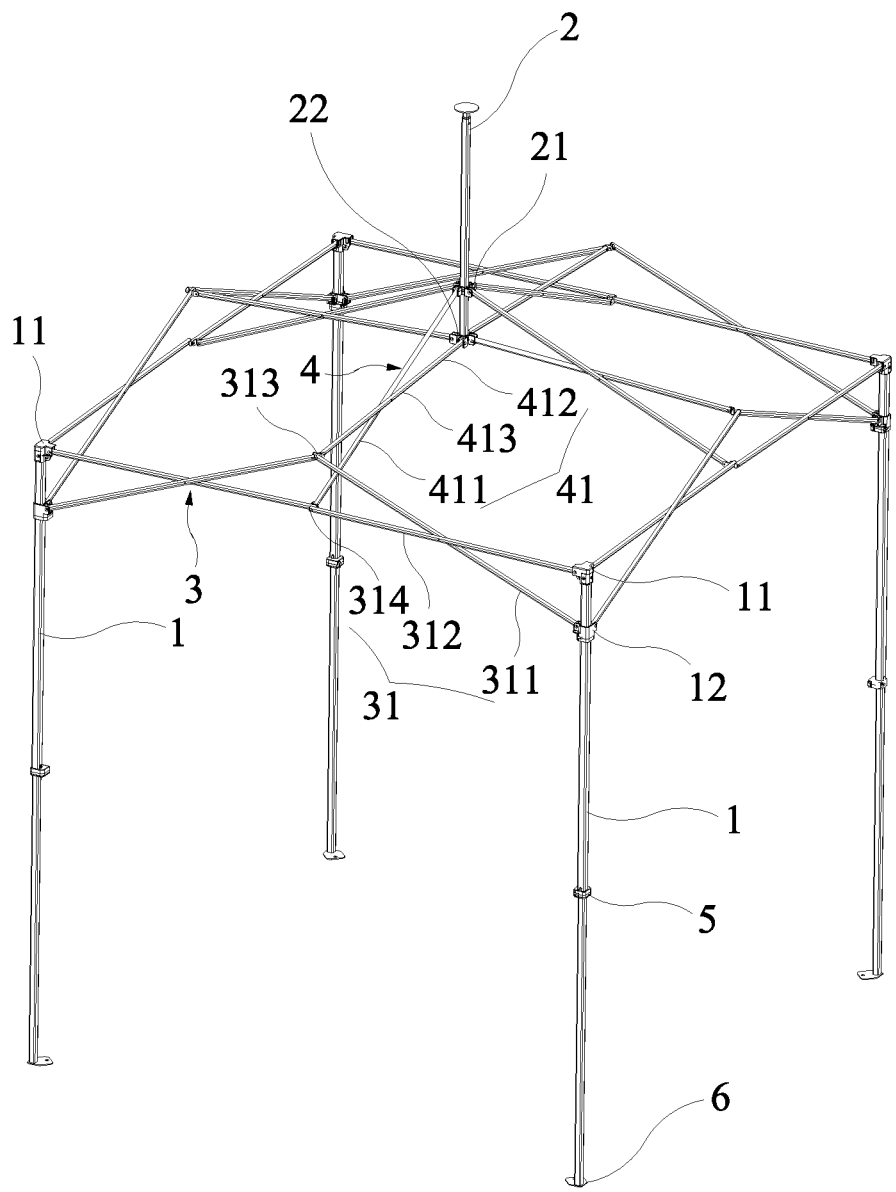
FIG. 1 is a perspective view of a first embodiment of the present invention in an unfolded state.

Embodiments of the present invention will now be described, by way of example only, with reference to the accompanying drawings.

Referring to FIG. 1 through FIG. 9, the present invention discloses a tent support, comprising a plurality upright rods 1, a top module 2 provided at the center of the top of the tent support, a plurality of side rod assemblies 3 each connected to every adjacent two of the upright rods 1, and a plurality of top rod assemblies 4 connected to the side rod assemblies 3 and the top module 2. A fixing seat 11 is mounted at the top of each upright rod 1. A sliding seat 12 is mounted on each upright rod 1 to slide along each upright rod 1 so as to move the side rod assemblies 3 and the top rod assemblies 4. The side rod assemblies 3 are connected to the fixing seats 11 of the upright rods 1. At least one positioning hole 01 is provided at the junction of two adjacent side walls of each upright rod 1. The sliding seat 12 includes a positioning member 121 which is selectively engaged in the positioning hole 01, a spring 122, a positioning pin 123, and an outward protruding button 124 therein. The positioning pin 123 runs inward through the sliding seat 12 and through the positioning member 121. An engaging groove 125 is provided on an end surface of the button 124 facing the positioning member 121. One end of the positioning member 121 is engaged in the engaging groove 125. One end of the spring 122 is abutted against the button 124. The other end of the spring 122 is abutted against the inner wall of the sliding seat 12. The bottom of each upright rod 1 is provided with a retaining part 6 so that the upright rod 1 can be retained at a designated position through the retaining part 6. Each upright rod 1 is formed by connecting and fixing a plurality of small rods through a fixing member 5, so as to facilitate disassembly and transportation.

Therefore, the tent support of the present invention is designed through the structure of the sliding seat 12 and the upright rod 1. Please refer to FIG. 3 in cooperation with FIG. 4 and FIG. 5, or refer to FIG. 6 in cooperation with FIG. 7 and FIG. 8, or refer to FIG. 8. When the tent support of the present invention needs to be folded, the user can press the button 124. The button 124 links the positioning member 121 that is engaged in the engaging groove 125 of the button 124 to slightly tilt up with the positioning pin 123 as the fulcrum. The positioning member 121 is disengaged from the positioning hole 01. At this time, because one end of the spring 122 abuts against the button 124 and the other end of the spring 122 abuts against the inner wall of the sliding seat 12, the spring 122 is compressed. Thus, the sliding seat 12 can smoothly slide down along the upright rod 1 to move the corresponding side rod assembly 3 and the corresponding top rod assembly 4 to be folded. When the tent support of the present invention needs to be unfolded and positioned, the user can press the button 124. The button 124 links the positioning member 121 that is engaged in the engaging groove 125 of the button 124 to tilt up with the positioning pin 123 as the fulcrum. At this time, because one end of the spring 122 abuts against the button 124 and the other end of the spring 122 abuts against the inner wall of the sliding seat 12, the spring 122 is compressed. Thus, the sliding seat 12 can slide up quickly along the upright rod 1 until the sliding seat 12 moves to the position of the positioning hole 01, and the button 124 is released. When the positioning member 121 moves up to the position corresponding to the positioning hole 01, the elastic force of the spring 122 enables the button 124 to protrude, and the positioning member 121 is linked to be engaged in the positioning hole 01, so that the tent support of the present invention is unfolded and positioned. The present invention realizes positioning through the cooperation of the positioning member 121 of the sliding seat 12 and the positioning hole 01 of the upright rod 1. Compared with the positioning of the sliding seat of the conventional tent support, the overall structure of the present invention is simple, easy to assemble and stable in positioning.

Figure 3:
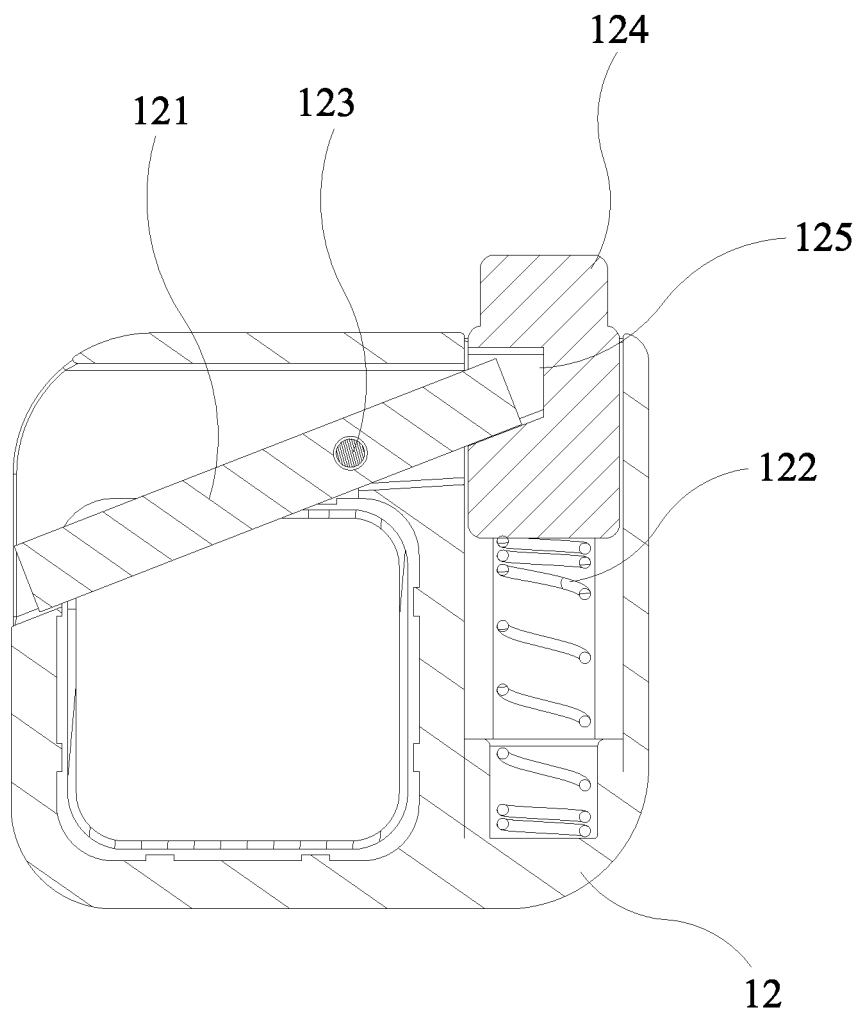
FIG. 3 is a first cross-sectional view of a first embodiment of the sliding seat of the present invention.
Figure 4:
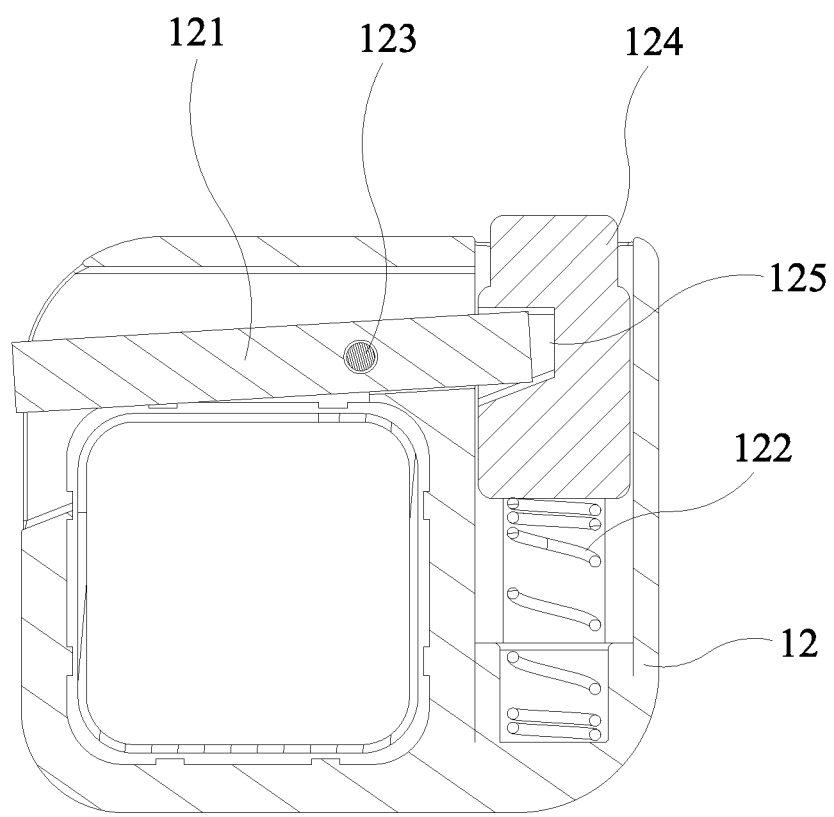
FIG. 4 is a second cross-sectional view of the first embodiment of the sliding seat of the present invention.
Figure 5:
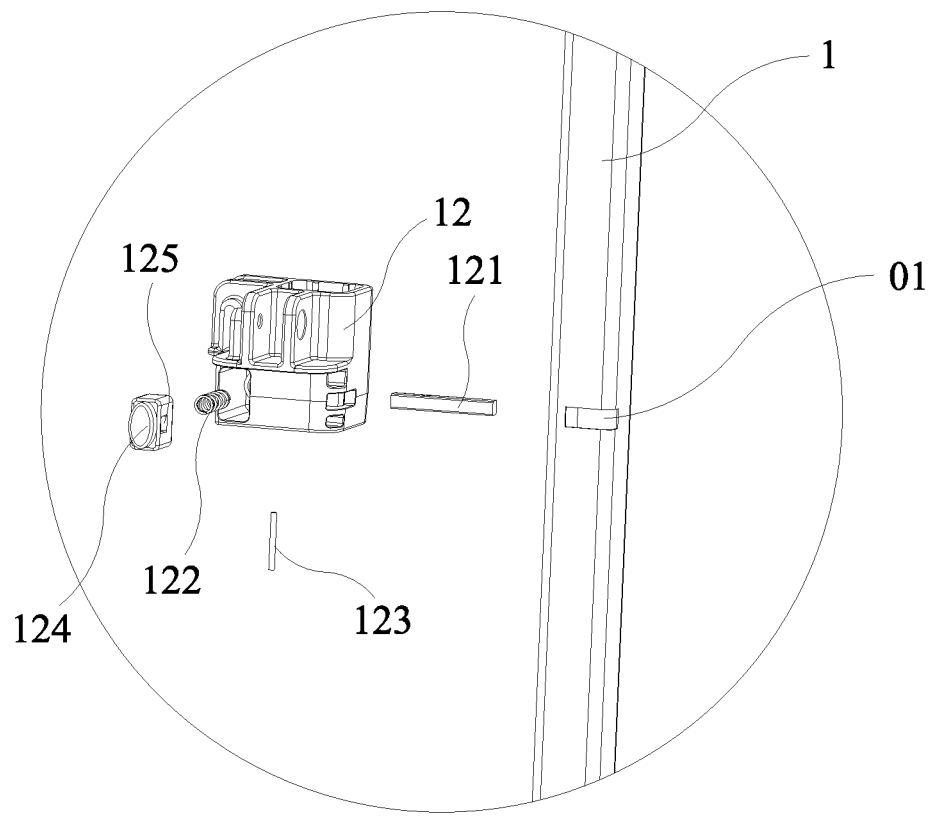
FIG. 5 is an exploded schematic view of the first embodiment of the positioning seat of the present invention.
Figure 6:
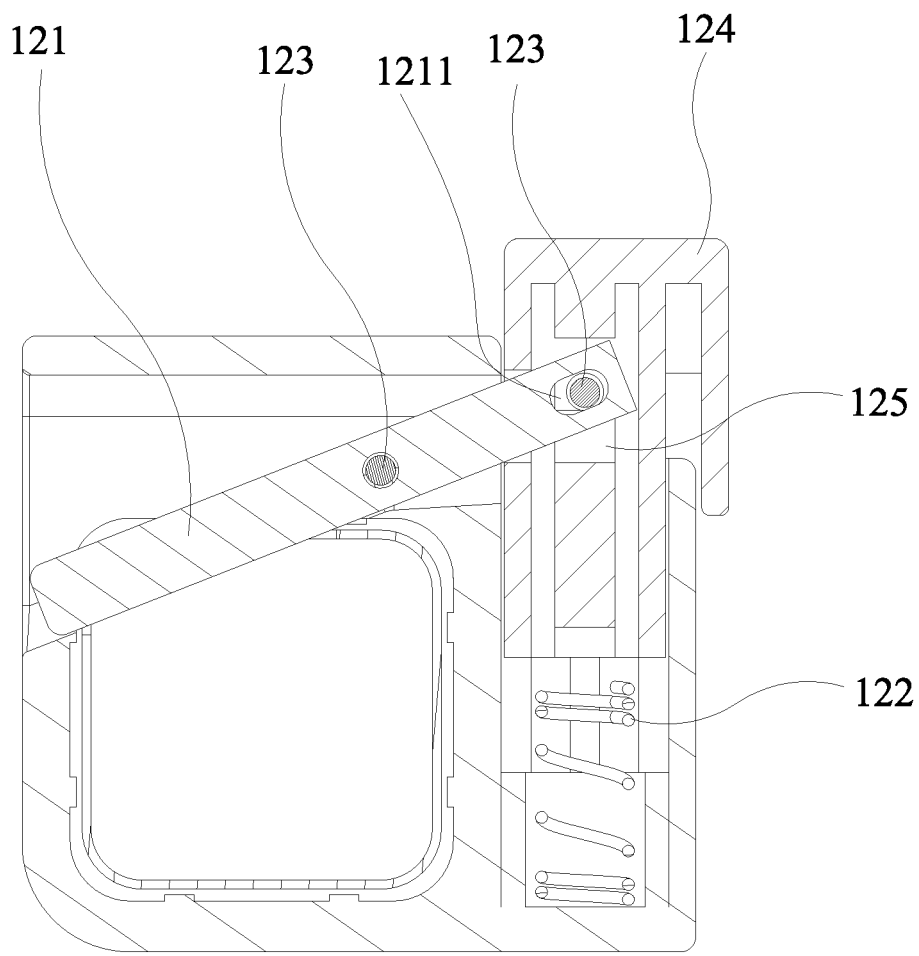
FIG. 6 is a first cross-sectional view of a second embodiment of the sliding seat of the present invention.
Figure 7:
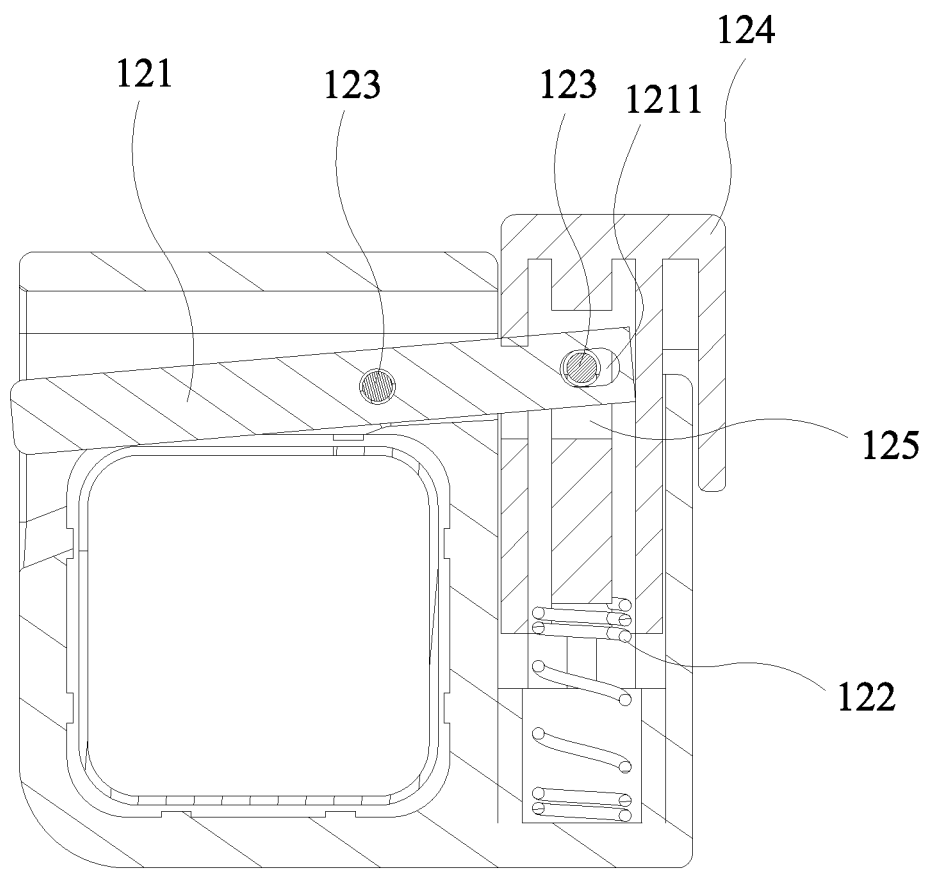
FIG. 7 is a second cross-sectional view of the second embodiment of the sliding seat of the present invention.
Figure 8:
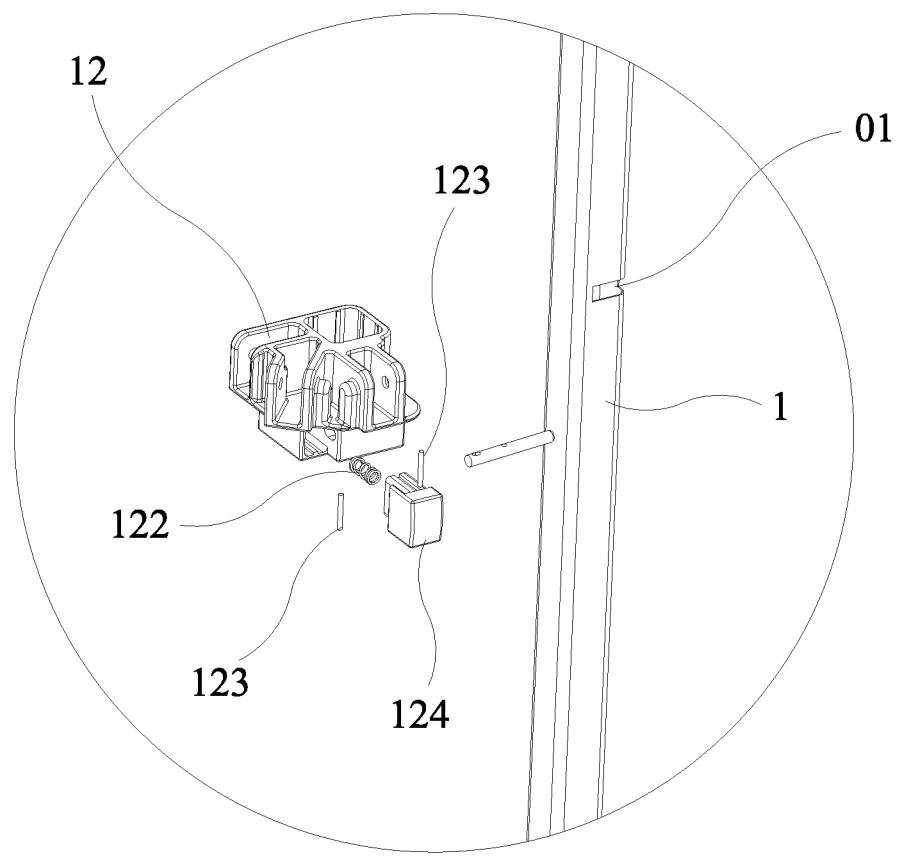
FIG. 8 is an exploded schematic view of the second embodiment of the positioning seat of the present invention.
Figure 9:
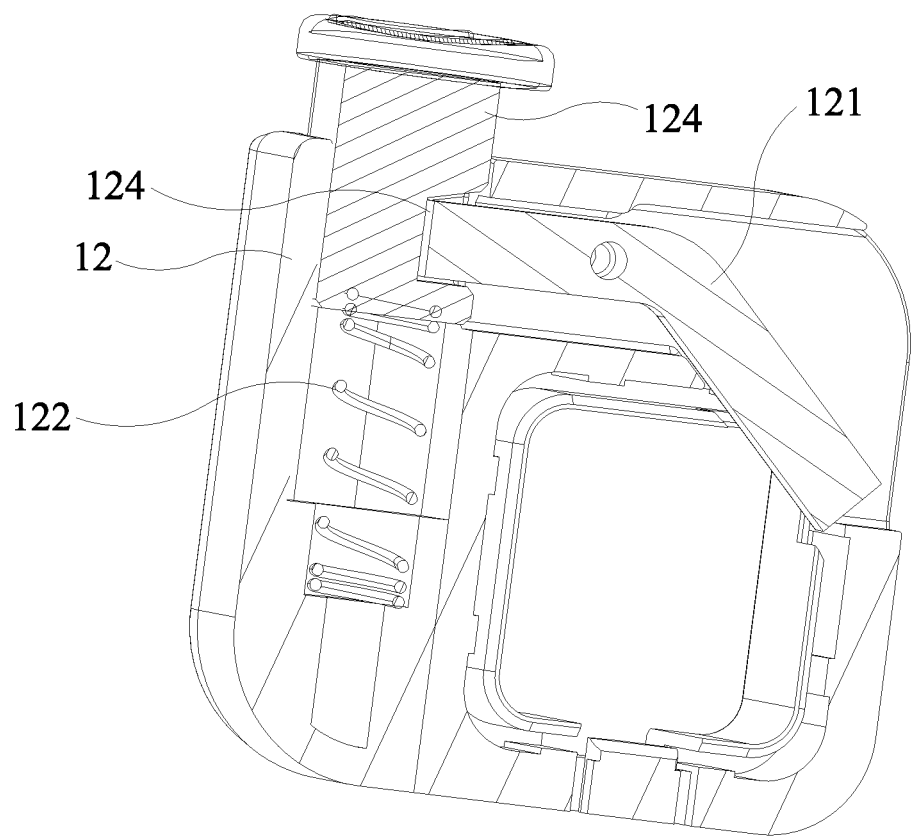
FIG. 9 is a cross-sectional view of a third embodiment of the sliding seat of the present invention.

In addition, FIGS. 3 to 5 show the first embodiment of the sliding seat of the present invention. In this embodiment, the positioning member 121 is an elongated bar. The difference between the second embodiment of the sliding seat of the present invention shown in FIGS. 6 to 8 and the first embodiment is that another positioning pin 123 is provided between the button 124 and the positioning member 121. One end of the positioning member 121 has a slot 1211 for limiting the movement of the positioning pin 123, so that the button 124 and the positioning member 121 can be linked more stably and firmly. FIG. 9 shows the difference between the third embodiment of the sliding seat of the present invention and the first embodiment in that the upright rods 1 are rectangular rods, and the positioning member 121 is ∧-shaped, so that the positioning of the positioning member 121 and the positioning hole 01 is firmer because the shape of the positioning member 121 is more similar to the shape of the positioning hole 01.

FIG. 1 shows a first embodiment of the present invention. In this embodiment, the top module 2 includes an upper runner 21 and a lower runner 22. Each side rod assembly 3 includes two link rod units 31 hinged at respective ends to each other. Each top rod assembly 4 includes a link rod unit 41. Each link rod unit 31 of each side rod assembly 3 includes two link rods 311, 312 that are hinged to each other and expanded into an "X" shape. The link rod unit 41 of each top rod assembly 4 includes a long rod 411 and a short rod 412 that are hinged to each other and expanded into an "X" shape. The first ends of the two link rods 311, 312 of the two link rod units 31 of each side rod assembly 3 are hinged to each other to form an upper hinge point 313 and a lower hinge point 314. The second ends of the two link rods 311, 312 of the two link rod units 31 of each side rod assembly 3 are hinged to the fixing seats 11 and the sliding seats 12 of the adjacent two of the upright rods 1, respectively. One end of the long rod 411 of each top rod assembly 4 is hinged to the lower hinge point 314 of the corresponding side rod assembly 3, and the other end of the long rod 411 is hinged to the upper runner 21 of the top module 2. One end of the short rod 412 of each top rod assembly 4 is hinged to the upper hinge point 313 of the corresponding side rod assembly 3, and the other end of the short rod 412 is hinged to the lower runner 22 of the top module 2. In this embodiment, the link rod unit 41 of each top rod assembly 4 is designed to include the long rod 411 and the short rod 412 that are hinged to each other and expanded into an "X" shape. Since the short rod 412 is hinged to the upper hinge point 313 of the corresponding side rod assembly 3 and the lower runner 22 of the top module 2, the expanded top rod assembly 4 will lift the upper hinge point 313 and the lower runner 22 upward, without sagging. Because the link rod units 31 of each side rod assembly 3 and the link rod unit 41 of each top rod assembly 4 are mutually linked and the link rod unit 41 of each top rod assembly 4 has the design of a long rod and a short rod, the top of the tent support can be lifted up as a whole to increase the space of the top of the tent. The asymmetrical design of the link rod unit 41 of the top rod assembly 4 can increase the space inside the tent, thereby improving the user's experience. After the top rod assembly 4 drives the upper hinge point of the side rod assembly 3 to lift up, the tent cloth is lifted up to prevent the tent cloth from sagging, thereby avoiding water accumulation on the tent cloth.

First, in this embodiment, the hinge point 413 of the long rod 411 and the short rod 412 of the link rod unit 41 of each top rod assembly 4 is arranged on one side of the link rod unit 41 close to the side rod assembly 3, so that the upper runner 21 is lifted to a higher height and the effect of preventing water accumulation is better. However, the hinge point 413 of the long rod 411 and the short rod 412 of the link rod unit 41 of each top rod assembly 4 may be arranged at the center point of the long rod 411 and the short rod 412. In the case that the hinge point 413 of the long rod 411 and the short rod 412 of the link rod unit 41 of each top rod assembly 4 may be arranged on one side of the link rod unit 41 close to the top module 2, the top rod assembly 4 lifts the upper runner 21 to a lower height and the effect of preventing water accumulation is worse.

Secondly, the two link rods 311, 312 of each link rod unit 31 of each side rod assembly 3 may be a long rod and a short rod to be mutually hinged like the top rod assembly 4, or may be two equal-length link rods to be hinged to each other to form the link rod unit 31. The two link rods 311, 312 of each link rod unit 31 may be hinged at the center point of the link rods 311, 312. In order to increase the stability of the tent, the two short rods 312 of the two link units 31 hinged to each other of the side rod assembly 3 form an angle of 180 degrees, and the angle between the two long rods 311 of each side rod assembly 3 is smaller than the angle between the two short rods 312. In this way, the two short rods can hold the two adjacent upright rods to avoid shaking of the tent, so the overall stability of the tent is better.

Furthermore, in this embodiment, the top module 2 further includes a central rod. The upper runner 21 and the lower runner 22 are arranged on the central rod. The upper runner 21 is slidably arranged on the central rod, and the lower runner 22 is fixed at the bottom end of the central rod.

Figure 2:
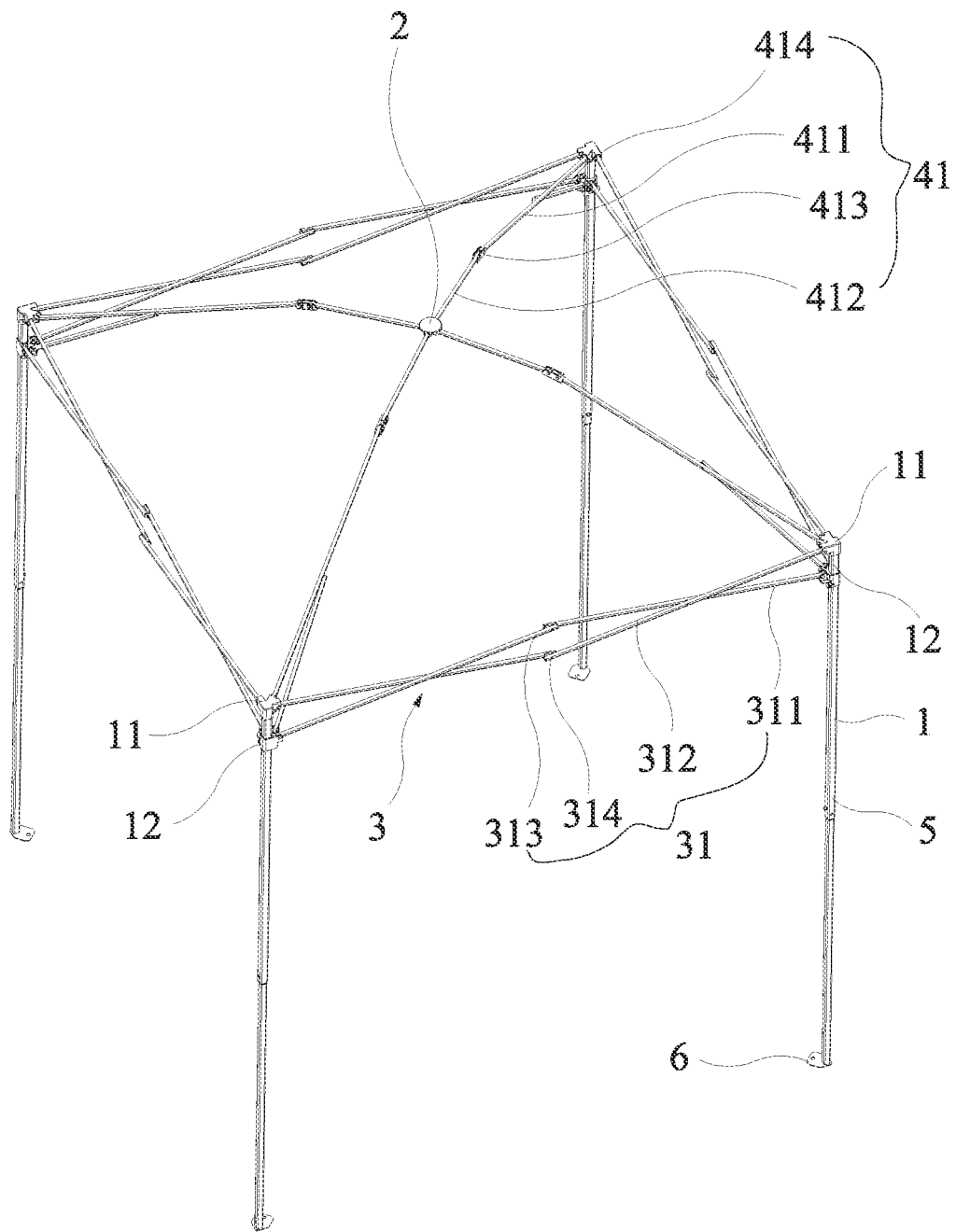
FIG. 2 is a perspective view of a second embodiment of the present invention in an unfolded state.

FIG. 2 shows a second embodiment of the present invention. In this embodiment, the top of the top module 2 is a circular plate, and a runner is provided under the circular plate. Each side rod assembly 3 includes two link rod units 31 hinged at respective ends to each other. Each top rod assembly 4 includes a link rod unit 41. Each link rod unit 31 of each side rod assembly 3 includes two link rods 311, 312 that are hinged to each other and expanded into an "X" shape. The opposing ends of the two link rods 311, 312 of the two link rod units 31 of each side rod assembly 3 are hinged to the fixing seats 11 and the sliding seats 12 of the adjacent two of the upright rods 1, respectively. The link rod unit 41 of each top rod assembly 4 includes a long rod 411 and a short rod 412 that are hinged to each other and expanded into a linear shape, and a support rod 414 having two ends hinged to the sliding seat 11 and the long rod 411, respectively. One end of the long rod 411 is hinged to one end of the short rod 412, and the other end of the long rod 411 is hinged to the fixing seat 11. The other end of the short rod 412 is hinged to the runner of the top module 2. Therefore, the top of the tent support can be lifted up as a whole, so that the space of the top of the tent is increased and the tent cloth is prevented from sagging, thereby preventing water accumulation on the tent cloth.

What is claimed is:

1. A tent support, comprising a plurality upright rods, a top module provided at a center of a top of the tent support, a plurality of side rod assemblies each connected to every adjacent two of the upright rods, and a plurality of top rod assemblies connected to the side rod assemblies and the top module; a fixing seat being mounted at a top of each upright rod, a sliding seat being mounted on each upright rod to slide along each upright rod so as to move the side rod assemblies and the top rod assemblies, the side rod assemblies being connected to the fixing seats of the upright rods, at least one positioning hole being provided at a junction of two adjacent side walls of each upright rod, the sliding seat including a positioning member which is selectively engaged in the positioning hole, a spring, a positioning pin and an outward protruding button therein, the positioning pin running inward through the sliding seat and through the positioning member, an engaging groove being provided on an end surface of the button facing the positioning member, one end of the positioning member being engaged in the engaging groove, one end of the spring being abutted against the button, another end of the spring being abutted against an inner wall of the sliding seat.

2. The tent support as claimed in claim 1, wherein the positioning member is an elongated bar.

3. The tent support as claimed in claim 1, wherein the upright rods are rectangular rods, and the positioning member is ⋀-shaped.

4. The tent support as claimed in claim 1, wherein a further positioning pin is provided between the button and the positioning member, and the end of the positioning member has a slot for limiting movement of the further positioning pin.

5. The tent support as claimed in claim 1, wherein the top module includes an upper runner and a lower runner, each side rod assembly includes two link rod units hinged at respective ends to each other, each top rod assembly includes a link rod unit, each link rod unit of each side rod assembly includes two link rods that are hinged to each other and expanded into an "X" shape, first ends of the two link rods of the two link rod units of each side rod assembly are hinged to each other to form an upper hinge point and a lower hinge point, second ends of the two link rods of the two link rod units of each side rod assembly are hinged to the fixing seats and the sliding seats of the adjacent two of the upright rods respectively, the link rod unit of each top rod assembly includes a long rod and a short rod that are hinged to each other and expanded into an "X" shape, one end of the long rod of each top rod assembly is hinged to the lower hinge point of a corresponding one of the side rod assemblies, another end of the long rod is hinged to the upper runner of the top module, one end of the short rod of each top rod assembly is hinged to the upper hinge point of the corresponding side rod assembly, and another end of the short rod is hinged to the lower runner of the top module.

6. The tent support as claimed in claim 5, wherein the top module further includes a central rod, and the upper runner and the lower runner are arranged on the central rod.

7. The tent support as claimed in claim 6, wherein the upper runner is slidably arranged on the central rod, and the lower runner is fixed at a bottom end of the central rod.

8. The tent support as claimed in claim 1, wherein a top of the top module is a circular plate, a runner is provided under the circular plate, each side rod assembly includes two link rod units hinged at respective ends to each other, each top rod assembly includes a link rod unit, each link rod unit of each side rod assembly includes two link rods that are hinged to each other and expanded into an "X" shape, opposing ends of the two link rods of the two link rod units of each side rod assembly are hinged to the fixing seats and the sliding seats of the adjacent two of the upright rods respectively, the link rod unit of each top rod assembly includes a long rod and a short rod that are hinged to each other and expanded into a linear shape, and a support rod having two ends hinged to the sliding seat and the long rod respectively, one end of the long rod is hinged to one end of the short rod, another end of the long rod is hinged to the fixing seat, and another end of the short rod is hinged to the runner of the top module.

9. The tent support as claimed in claim 1, wherein a bottom of each upright rod is provided with a retaining part.

10. The tent support as claimed in claim 1, wherein each upright rod is formed by connecting and fixing a plurality of small rods through a fixing member.

* * * * *